US012672110B2

(12) United States Patent
Lin et al.

(10) Patent No.: US 12,672,110 B2
(45) Date of Patent: Jun. 30, 2026

(54) USER EQUIPMENT AND RESOURCE SELECTION METHOD IN SIDELINK COMMUNICATION

(71) Applicant: GUANGDONG OPPO MOBILE TELECOMMUNICATIONS CORP., LTD., Dongguan (CN)

(72) Inventors: Huei-Ming Lin, Taipei (TW); Zhenshan Zhao, Dongguan (CN); Shichang Zhang, Dongguan (CN); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 18/376,522

(22) Filed: Oct. 4, 2023

(65) Prior Publication Data

US 2024/0031997 A1     Jan. 25, 2024

Related U.S. Application Data

(63) Continuation of application No. PCT/CN2021/085706, filed on Apr. 6, 2021.

(51) Int. Cl.
*H04W 72/02*          (2009.01)
*H04W 72/25*          (2023.01)

(52) U.S. Cl.
CPC ........... *H04W 72/02* (2013.01); *H04W 72/25* (2023.01)

(58) Field of Classification Search
CPC ............................... H04W 72/02; H04W 72/25
See application file for complete search history.

(56) References Cited

U.S. PATENT DOCUMENTS

| | | | |
|---|---|---|---|
| 2020/0229171 A1 | 7/2020 | Khoryaev et al. | |
| 2020/0374861 A1 | 11/2020 | Shilov et al. | |
| 2022/0015071 A1* | 1/2022 | Hui ........................ | H04W 72/56 |
| 2023/0337187 A1* | 10/2023 | Ye ...................... | H04W 52/0235 |
| 2023/0345422 A1* | 10/2023 | Lin ........................ | H04W 76/28 |

(Continued)

FOREIGN PATENT DOCUMENTS

| | | |
|---|---|---|
| CN | 111246426 A | 6/2020 |

OTHER PUBLICATIONS

3GPP TSG RAN WG1 Meeting #100bis-e; R1-2001552; E-meeting, Apr. 20-Apr. 30, 2020 Source: Huawei, HiSilicon; Title: Remaining details of sidelink resource allocation mode 2.

(Continued)

*Primary Examiner* — Won Tae C Kim
(74) *Attorney, Agent, or Firm* — BAYES PLLC

(57)          ABSTRACT

A UE and a resource selection method in sidelink communication are provided. The resource selection method includes being triggered in a first slot, by a periodic-based partial sensing initiation from a higher layer, to start a periodic-based partial sensing and performing the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain.

14 Claims, 4 Drawing Sheets

610

612 — Being triggered in a first slot, by a periodic-based partial sensing initiation from a higher layer, to start a periodic-based partial sensing 614 — Performing the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain

(56) References Cited

U.S. PATENT DOCUMENTS

2023/0371051 A1* 11/2023 Yoshioka ............... H04W 72/40
2024/0008074 A1* 1/2024 Miao ..................... H04W 72/02

OTHER PUBLICATIONS

3GPP TSG RAN WG1 #104-e; R1-2101412; e-Meeting, Jan. 25-Feb. 5, 2021 Source: Moderator (OPPO); Title: FL summary for AI 8.11.1.1—resource allocation for power saving.
3GPP TSG RAN WG1 #104-e; R1-2100141; e-Meeting, Jan. 25-Feb. 5, 2021 Source: OPPO; Title: Power saving mechanisms in NR sidelink.
International Search Report issued in International application No. PCT/CN2021/085706, mailed Jan. 10, 2022.
Written Opinion of the International Searching Authority issued in International application No. PCT/CN2021/085706, mailed Jan. 10, 2022.
Extended European Search Report issued in corresponding European application No. 21935515.3, mailed Apr. 4, 2024.
Source : CAICT; Title : Considerations on partial sensing in NR V2X 3GPP TSG RAN WG1 Meeting #104-e R1-2100309 e-Meeting, Jan. 25-Feb. 5, 2021.

* cited by examiner

30

610

612

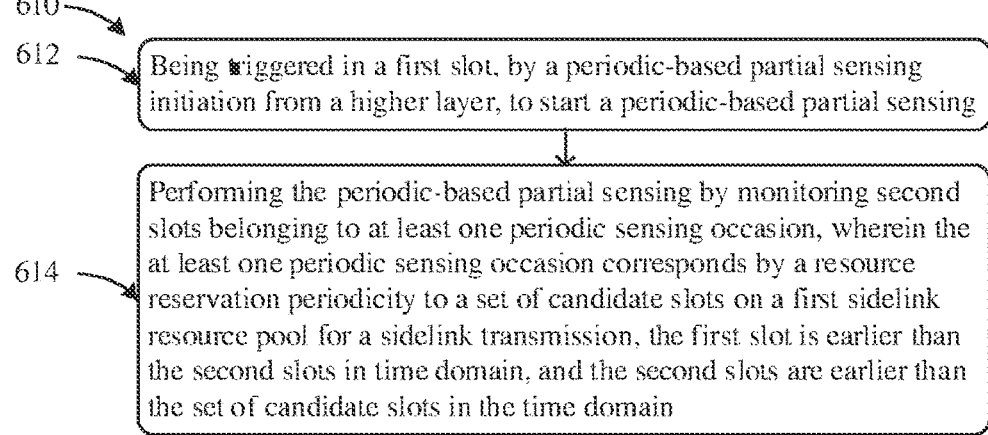

Being triggered in a first slot, by a periodic-based partial sensing initiation from a higher layer, to start a periodic-based partial sensing

614

Performing the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain

FIG. 4

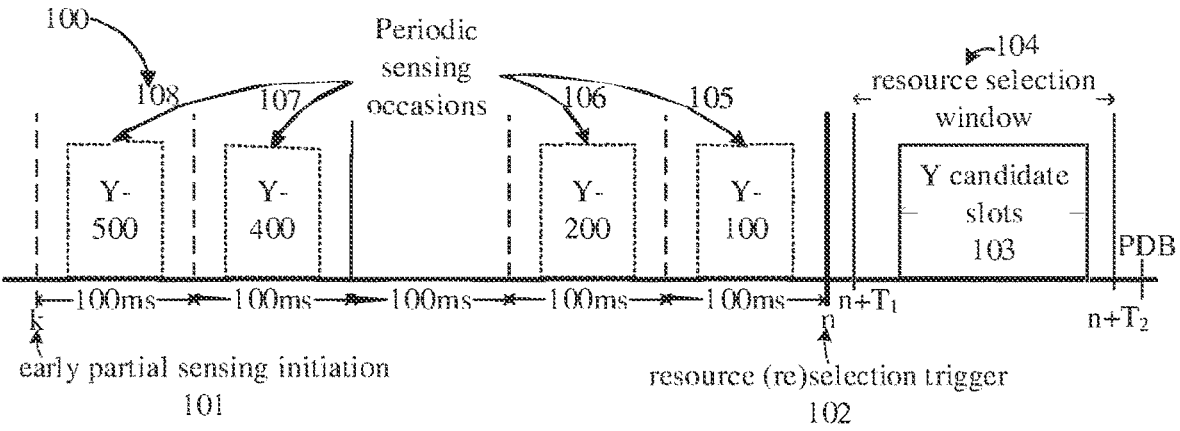

USER EQUIPMENT AND RESOURCE SELECTION METHOD IN SIDELINK COMMUNICATION

CROSS-REFERENCE TO RELATED APPLICATION

This application is a continuation of International Application No. PCT/CN2021/085706, filed on Apr. 6, 2021, which is incorporated herein by reference in its entirety.

TECHNICAL FIELD

The present disclosure relates to the field of communication systems, and more particularly, to a user equipment (UE) and a resource selection method in sidelink communication, which can provide a good communication performance and/or provide high reliability.

BACKGROUND

In a current art, a pedestrian user equipment (PUE) needs to perform periodic pre-sensing (partial sensing) all the time just in case the PUE may have a new data to transmit. In certain PUE implementation, the partial sensing may be performed as soon as a pedestrian-to-everything (P2X) resource pool is configured even when the PUE may not have any data to transmit for a long time. For example, typically a PUE (such as a smartphone) is programmed to transmit P2X data only when the PUE is close to a road or at an intersection based on its geographical location, and no transmission when in an office. As such, it is very power consuming for the PUE, which always relies on a battery, to always perform radio reception and sensing to obtain utilization and reservation information of sidelink (SL) resources when the PUE has no data to transmit.

Different traffic types (both aperiodic and periodic), traffic patterns (e.g., frequent transmission periodicities) and different latency requirement/packet delay budget (PDB) values need to be supported in new radio (NR)-sidelink. Therefore, it is not reasonable and even technically beneficial for power-constrained UEs to always perform partial sensing on SL resources when it is not necessary and based on an assumption of a certain traffic characteristic, for which it may not be aligned with the real data when there is one.

Therefore, there is a need for a user equipment (UE) and a sidelink resource exclusion method, which can solve issues in the prior art, reduce power consumption wastage, handle other sudden and unpredictable resource selection/re-selection triggers, reduce transmission collisions with aperiodic traffic from other UEs, provide a good communication performance, and/or provide high reliability.

SUMMARY

An object of the present disclosure is to propose a user equipment (UE) and a resource selection method in sidelink communication, which can solve issues in the prior art, reduce power consumption wastage, handle other sudden and unpredictable resource selection/re-selection triggers, reduce transmission collisions with aperiodic traffic from other UEs, provide a good communication performance, and/or provide high reliability.

In a first aspect of the present disclosure, a user equipment (UE) includes a memory, a transceiver, and a processor coupled to the memory and the transceiver. The processor is configured to be triggered in a first slot, by a periodic-based partial sensing initiation from a higher layer, to start a periodic-based partial sensing. The processor is configured to perform the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain.

In a second aspect of the present disclosure, a resource selection method in sidelink communication by a user equipment (UE) includes being triggered in a first slot, by a periodic-based partial sensing initiation from a higher layer, to start a periodic-based partial sensing and performing the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a flowchart illustrating a resource selection method in sidelink communication by a user equipment (UE) according to an embodiment of the present disclosure.

FIG. 5 is a schematic diagram illustrating an exemplary illustration of an early/prior indication of periodic-based partial sensing according to an embodiment of the present disclosure.

DETAILED DESCRIPTION

Figure 1:
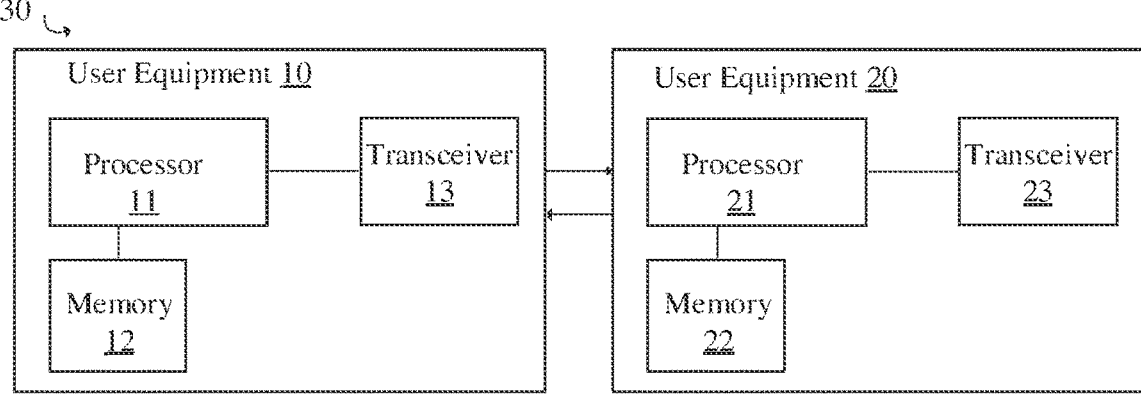
FIG. 1 is a block diagram of user equipments (UEs) of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In the advancement of radio wireless technology for vehicle-to-everything (V2X) transmission, 4th generation (4G) long term evolution (LTE) based sidelink (SL) communication was developed by 3rd generation partnership project (3GPP), which is also commonly known as LTE-V2X or simply LTE-V. The LTE-V was the first version of sidelink communication technology designed to support V2X use cases for road safety application, e.g., sending basic safety and emergency warning messages directly from one vehicle to another with vehicle's direction, acceleration/braking status, types of warning, and etc., to avoid traffic accidents and to help emergency vehicles travelling safely and smoothly on the road. Since the primary usage of LTE-V sidelink communication is to enhance the road safety, it is essential and expected that vehicle user equipment (VUE) is required to receive all of these types of messages (or as many as possible) when travelling on the road. Technologically, this means VUE would be capable of performing a full sensing operation of monitoring SL resource usage by measuring and decoding sidelink control information (SCI) in all subframes of a SL resource pool.

On the other hand, vulnerable road users (VRUs) such as pedestrians crossing the road and riding bikes on the street are also subject to road safety. As such, pedestrian-to-everything (P2X) communication and wireless transmission traffic from pedestrian UE (PUE) are also supported in LTE-V. However, unlike the VUE, a PUE such as smartphone or bike helmet operates on battery which has limited amount of power. Therefore, a power saving mechanism for PUE to perform sensing on partial/reduced amount of SL resources is introduced in LTE-V to reduce the amount of power consumption required for P2X transmissions while still trying to minimize the chance of transmission (Tx) collision with transmissions from other UEs.

For PUE transmissions in LTE-V, for simplicity it is assumed that all P2X traffic are periodic in nature. That is, when a dedicated P2X SL resource pool is configured for PUE transmissions, it is predictable for a PUE to determine the resource location of subsequent SL transmissions from another PUE when the SCI containing resource reservation information is sensed/decoded. It is then based on this resource reservation principle and the predictability of future sidelink transmission from others, the LTE-V partial sensing scheme requires that a transmitter PUE (Tx-UE) to perform pre-sensing in certain SL timing subframes in the past to obtain resource reservation information from others, exclude resources that are already reserved by others from a candidate resource set and select among the remaining resources for its own transmissions.

Specifically, when a physical layer of the Tx-UE is triggered by higher layer(s) for SL resource selection in subframe (n) (e.g., due to data arrival from higher layer(s) for SL transmission or when the SL resource reselection counter reaches zero), the Tx-UE senses/monitors periodically occurred subframes in the past (before subframe n) that correspond to a set of Y candidate subframes in the future (after subframe n), and reports the remaining candidate resources to the higher layer(s) for selection. However, for a new data to be first time transmitted, it is assumed not possible for a PUE physical layer to predict or known prior to the resource (re)selection triggering timing (n) such that it is able perform the pre-sensing in advance and obtain sensing results in order to exclude reserved resources from the candidate resource set.

Since this behavior/requirement is specified in 3GPP specification, the PUE will need to perform periodic pre-sensing (partial sensing) all the time just in case the PUE may have a new data to transmit. In certain PUE implementation, the partial sensing may be performed as soon as a P2X resource pool is configured even when the PUE may not have any data to transmit for a long time. For example, typically a PUE (such as a smartphone) is programmed to transmit P2X data only when the PUE is close to a road or at an intersection based on its geographical location, and no transmission when in an office. As such, it is very power consuming for the PUE, which always relies on a battery, to always perform radio reception and sensing to obtain utilization and reservation information of sidelink (SL) resources when the PUE has no data to transmit.

As part of evolution of mobile wireless communication, V2X and P2X services continue to be supported in the new generation of 5th generation new radio (5G-NR) sidelink communication system. In addition to V2X and P2X, other services and use cases such as public safety and commercial applications are also to be supported by the new NR-sidelink system. For many devices of these new target services and applications, they also run-on batteries with very limited supply of power (e.g., portable/backpack terminals for public safety personnel, AR/VR glasses, home and industrial IoT devices). Furthermore, different traffic types (both aperiodic and periodic), traffic patterns (e.g., frequent transmission periodicities) and different latency requirement/packet delay budget (PDB) values (i.e., other than just 100 ms in LTE-V) need to be supported in NR-sidelink. Therefore, it is not reasonable and even technically beneficial for power-constrained UEs to always perform partial sensing on SL resources when it is not necessary and based on an assumption of a certain traffic characteristic, for which it may not be aligned with the real data when there is one.

For some embodiments of the present inventive mechanism of periodic pre-sensing of sidelink resources, it aims to resolve the above problems of power consumption wastage for a power constraint UE that it always performs partial sensing and non-applicability of partial sensing results due to wrong assumption on the future sidelink data traffic by performing pre-sensing only when there is sidelink data and based on the actual attributes of the sidelink data to be transmitted. In some embodiments, other benefits of adopting the newly invented periodic pre-sensing mechanism include: be able to handle other sudden and unpredictable resource selection/re-selection triggers due to changing in the size of the sidelink MAC-PDU/TB, transmission periodicity, packet delay budget (latency requirement), or re-selection triggered by packet dropping or resource pool re-configuration, and reduced transmission collisions with aperiodic traffic from other UEs by monitoring slots within a contiguous time duration for temporary transmissions.

In some embodiments, in the present disclosure of inventive methods for wireless resource selection or re-selection of a sidelink grant, primarily intended to be used by a power constraint wireless communication terminal for new radio—sidelink (NR-SL) transmission of one or more medium access control (MAC) protocol data units (PDUs) or transport blocks (TBs), a physical layer of a terminal (hereafter referred as user equipment (UE)) performs partial sensing in only certain/limited number of slots on at least one selected sidelink resource pool (RP) to receive physical sidelink control channel (PSCCH) and decode sidelink control information (SCI) to obtain resource assignment and periodic reservation information transmitted from other SL terminals. Then based on the gathered resource allocation information, the UE excludes already reserved resources and reports a subset of resources to higher layers for the (re)selection of resource of a sidelink grant for its own physical sidelink shared channel (PSSCH) and PSCCH transmission. When the feature of resource reservation for another TB is enabled for the selected sidelink RP (i.e., periodic reservation of resources is allowed in the RP), the UE performs sensing according to the reservation periodicities (pre-)configured for the RP in order to ensure that all possible periodically reserved and colliding resources are obtained and excluded by the UE as much as possible before the reporting.

In some embodiments, in the existing periodic-based partial sensing design, it requires the UE to perform some pre-sensing prior to a resource (re)selection trigger slot (n) in sensing occasions that correspond to the set of resource reservation periodicities (pre-)configured for a chosen side-link RP. However, due to an unpredictable nature of sidelink data generation from UE's upper layers such as the application layer and sidelink resource re-selection trigger (e.g., due to network re-configuration of sidelink resource pool, changes in sidelink data attributes such as MAC PDU/TB size, transmission periodicity and latency requirement/packet delay budget (PDB), dropping of sidelink transmission(s), and etc.), it would not be possible for the UE to estimate or obtain knowledge in advance the slot timing in which the resource (re)selection will be triggered. As such, the per-sensing results cannot be obtained by the UE at the time when the resource re-selection is actually triggered by a higher layer (i.e., MAC layer/layer 2 (L2)). And without the pre-sensing results, the UE would not be able to exclude resources already periodically reserved by other UEs during the resource re-selection process to avoid transmission collisions. To mitigate this unavailability of pre-sensing result problem and to ensure timely sidelink transmission when the data is actually generated/passed down from higher layer(s) and resource (re)selection is triggered in slot (n), one or more or a combination of the following methods in some embodiments of the present disclosure could be adopted.

FIG. 1 illustrates that, in some embodiments, one or more user equipments (UEs) 10 and one or more user equipments (UEs) 20 of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

Figure 2:
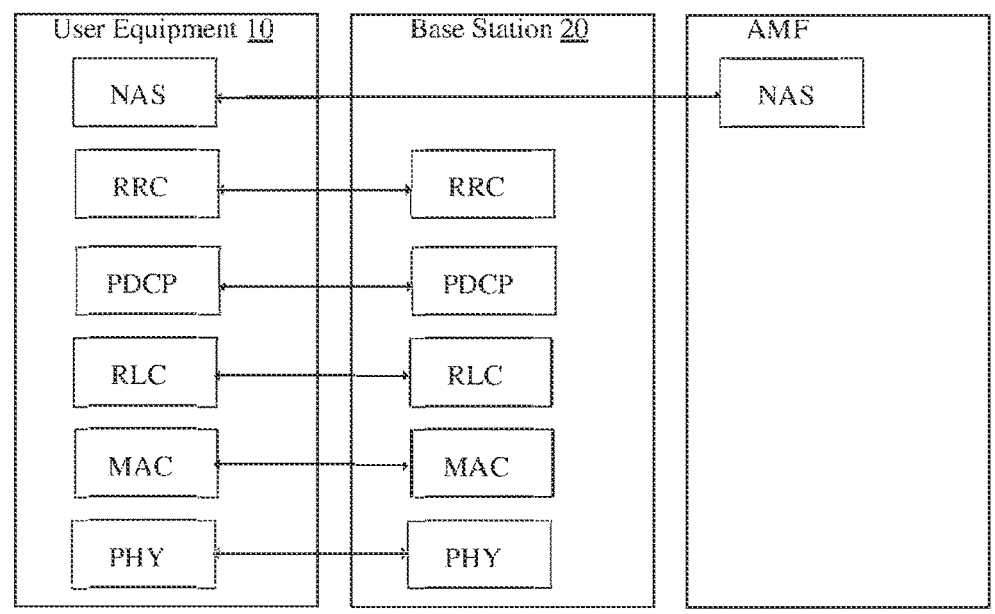
FIG. 2 is a schematic diagram illustrating an example user plane protocol stack according to an embodiment of the present disclosure.

FIG. 2 illustrates an example user plane protocol stack according to an embodiment of the present disclosure. FIG. 2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a UE 10 and a base station 20 (such as gNB) on a network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC service data units (SDUs) belonging to one or different logical channels into/from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

Figure 3:
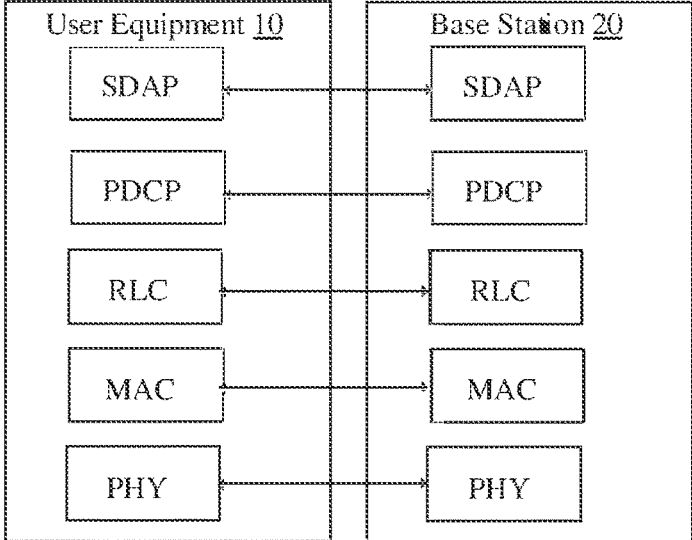
FIG. 3 is a schematic diagram illustrating an example control plane protocol stack according to an embodiment of the present disclosure.

FIG. 3 illustrates an example control plane protocol stack according to an embodiment of the present disclosure. FIG. 2 illustrates that, in some embodiments, in the control plane protocol stack where PDCP, RLC, and MAC sublayers and PHY layer may be terminated in a UE 10 and a base station 20 (such as gNB) on a network side and perform service and functions described above. In an example, RRC used to control a radio resource between the UE and a base station (such as a gNB). In an example, RRC may be terminated in a UE and the gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or non-access stratum (NAS) message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

When a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

In some embodiments, the processor 11 is configured to be triggered in a first slot, by a periodic-based partial sensing initiation from a higher layer, to start a periodic-based partial sensing. The processor 11 is configured to perform the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain. This can solve issues in the prior art, reduce power consumption wastage, handle other sudden and unpredictable resource selection/re-selection triggers, reduce transmission collisions with aperiodic traffic from other UEs, provide a good communication performance, and/or provide high reliability.

FIG. 4 illustrates a resource selection method 610 in sidelink communication by a user equipment (UE) according to an embodiment of the present disclosure. In some embodiments, the method 610 includes: a block 612, being triggered in a first slot, by a periodic-based partial sensing initiation from a higher layer, to start a periodic-based partial sensing, and a block 614, performing the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain. This can solve issues in the prior art, reduce power consumption wastage, handle other sudden and unpredictable resource selection/re-selection triggers, reduce transmission collisions with aperiodic traffic from other UEs, provide a good communication performance, and/or provide high reliability.

In some embodiments, the sidelink transmission comprises a physical sidelink control channel (PSCCH) transmission and/or a physical sidelink shared channel (PSSCH) transmission. In some embodiments, the UE performs the periodic-based partial sensing according to one or more of the followings: the first sidelink resource pool from which a subset of resources is to be reported; a layer 1 (L1) priority for the sidelink transmission; a remaining packet delay budget (PDB) configured to determine a first resource selection window; a number of sub-channels to be used for the sidelink transmission; or at least one resource reservation interval (P rsvp_TX) for the sidelink transmission and/or configured to determine a resource (re)selection trigger slot for the set of candidate slots. In some embodiments, the set of candidate slots are selected by the UE within the first resource selection window based on the resource (re)selection trigger slot. In some embodiments, the resource (re)selection trigger slot can be determined based on: an early/prior indication in the first slot from the higher layer, wherein the early/prior indication comprises the periodic-based partial sensing initiation; a location of the resource (re)selection trigger slot in the time domain equal to a location of the first slot in the time domain plus the at least one resource reservation interval (P rsvp_TX) in the time domain indicated by the higher layer; the location of the resource (re)selection trigger slot in the time domain equal to the location of the first slot in the time domain plus at least one maximum resource reservation period configured for the first sidelink resource pool; or the location of the resource (re)selection trigger slot in the time domain equal to the location of the first slot in the time domain plus at least one of resource reservation periodicities configured for the first sidelink resource pool.

In some embodiments, the higher layer comprises a medium access control (MAC) layer on a UE side. In some embodiments, the UE initializes a set of resources containing candidate resources within the set of candidate slots. In some embodiments, the UE is configured to receive a first sidelink control information (SCI) from another UE in the second slots belonging to the at least one periodic sensing occasion, the UE is configured to measure a first reference signal received power (RSRP) for the received first SCI during the periodic-based partial sensing, and when one or more resources from the candidate resources have been indicated/reserved by the first SCI and the associated first RSRP is higher than a first RSRP threshold, the UE excludes the one or more resources from the candidate resources. In some embodiments, the UE reports the subset of resources from the first sidelink resource pool to the higher layer in the resource (re)selection trigger slot or after the resource (re) selection trigger slot but before a starting slot of the set of candidate slots, and the subset of resources comprises remaining candidate resources after exclusion. In some embodiments, the UE is further indicated by the higher layer a second sidelink resource pool for the sidelink transmission of at least one sidelink MAC protocol data unit (PDU) or at least one sidelink transport block (TB) before the resource (re)selection trigger slot for the first sidelink resource pool in the time domain.

In some embodiments, the second sidelink resource pool comprises an exceptional pool, a pool that allows partial sensing and/or random resource selection, and/or a pool that does not support resource reservation for another TB for periodic reservation. In some embodiments, an indication of the second sidelink resource pool is provided from the higher layer in a third slot, and the third slot and the first slot in the time domain can be a same slot or different slots. In some embodiments, in the third slot, the UE is triggered, by the higher layer, to perform a resource (re)selection procedure to report a subset of candidate resources based on partial sensing by decoding the sidelink transmission and measuring an RSRP on the sidelink transmission. In some embodiments, the UE performs the resource (re)selection procedure according to one or more of the followings for the sidelink transmission of the at least one sidelink MAC PDU or the at least one sidelink TB: an L1 priority; a remaining PDB; or a number of sub-channels to be used for the sidelink transmission. In some embodiments, the UE initializes a set of resources containing candidate resources within a second resource selection window after the third slot in the time domain.

In some embodiments, the UE monitors slots within a contiguous time duration after the third slot and before the second resource selection window in the time domain and excludes one or more resources from the candidate resources when the one or more resources have been indicated/reserved by receiving a second SCI from another UE and the measured second RSRP is higher than a second RSRP threshold, wherein the contiguous time duration ranges between the third slot plus $T_A$ and the third slot plus $T_B$, values for $T_A$ and $T_B$ can be zero or positive. In some embodiments, the UE reports the subset of resources to the higher layer in the third slot plus $T_B$ or after the third slot plus $T_B$, and the subset of resources comprises remaining candidate resources after exclusion. In some embodiments, the UE is requested to report candidate resources of the first sidelink resource pool to the higher layer in the first slot for the sidelink transmission.

In some embodiments, the candidate resources of the first sidelink resource pool are determined according to one or more of the followings: a number of sub-channels to be used for the sidelink transmission provided by the higher layer; or a set of slots from a current transmission period that correspond to the candidate slots based on a resource reservation interval ($P_{rsvp\_TX}$) for the sidelink transmission. In some embodiments, the higher layer randomly selects one or more resources among the reported candidate resources of the first sidelink resource pool for the sidelink transmission of at least one sidelink MAC PDU or at least one sidelink $T_B$. In some embodiments, when the UE transmits the sidelink transmission, a resource reservation period field in an SCI format is set according to the resource reservation interval ($P_{rsvp\_TX}$) provided by the higher layer. In some embodiments, if one of reserved resources is not part of reported subset of candidate resources to the higher layer, the reserved resource is removed from a sidelink grant and replaced with a re-selected resource from the reported subset of resources.

To mitigate this unavailability of pre-sensing result problem and to ensure timely sidelink transmission when the data is actually generated/passed down from higher layer(s) and resource (re)selection is triggered in slot (n), one or more or a combination of the following methods in some embodiments of the present disclosure could be adopted.

In one embodiment of the present disclosure, an exemplary method 1 for the UE to obtain pre-sensing results before a resource (re)selection trigger in slot (n) in order to exclude reserved resource(s) by another UE and report a subset of candidate resource, the UE receives an early/prior indication of the resource (re)selection trigger for slot (n) from a higher layer and/or a request to initiate periodic-based partial sensing for a set of Y candidate slots. In an example, when an application layer generates data traffic/messages to be communicated to other terminals, it often does not provide to its lower layers the frequency/periodicity for which the data messages will be generated for transmission (e.g., the application layer simply does not have this knowledge as well) and often relies on the lower layer to observe the traffic generated from the upper/higher layer(s) (e.g., over a training period) and determine its pattern and periodicity. In the meantime, the data packets may be dropped or transmitted in an aperiodic manner (i.e., event triggered). As such, it is possible for the higher layer (such as MAC layer) to provide an early/prior indication to the UE that a resource (re)selection will be triggered in a certain slot in the future, denoted as slot (n), and/or request the UE to initiate a periodic-based partial sensing in advance such that the UE is able to obtain pre-sensing results for the resource (re)selection procedure to be triggered in slot (n).

To initiate the periodic-based partial sensing, the higher layer provides one or more of the following parameters/attributes associating to the actual sidelink data to be transmitted by the UE in PSCCH/PSSCH. 1. A selected sidelink resource pool from which a subset of resources is to be reported. 2. L1 priority for determining the size of Y candidate slots and/or resource exclusion. 3. Remaining packet delay budget (PDB) for determining a resource selection window. 4. A number of sub-channels to be used for the PSCCH/PSSCH transmission ($L_{subcH}$). 5. A resource reservation interval ($P_{rsvp\_TX}$) for the PSCCH/PSSCH transmission and/or determining a resource (re)selection trigger slot (n).

When the higher layer provides an early/prior indication of a slot timing (n) for a resource (re)selection to be triggered and initiates the UE to perform partial sensing in a selected resource pool that supports resource reservation for another $T_B$, the UE first selects a set of Y candidate slots within a resource selection window (RSW) ([n+$T_1$, n+$T_2$]), and then monitors slots belonging to the selected RP within at least one periodic sensing occasion that corresponds to the Y candidate slots according to at least one reservation periodicities (pre-)configured for the RP. The behavior of monitoring slots within one periodic sensing occasion is performed by the UE to decode PSCCH and measure reference signal received power (RSRP) in these slots. As such, when the resource (re)selection is actually triggered in slot (n), the UE would have pre-sensing results that can be used for resource exclusion of periodically reserved ones with measured RSRP higher than the corresponding threshold, and report a subset of candidate resources to the higher layer at the resource (re)selection trigger slot (n) or after but before the first slot of the Y candidate slots for the final selection or re-selection.

If the higher layer does not provide an early/prior indication of a slot timing (n) for a resource (re)selection triggered and initiates the UE to perform partial sensing in a slot (k), the UE determines the resource (re)selection will be triggered in slot (n) by assuming/using one of the followings: 1. Resource (re)selection trigger slot (n)=partial sensing initiating slot (k)+at least one resource reservation interval ($P_{rsvp\_TX}$) indicated for the PSCCH/PSSCH transmission. 2. Resource (re)selection trigger slot (n)=partial sensing initiating slot (k)+at least one maximum resource reservation period (pre-)configured for the RP. 3. Resource (re)selection trigger slot (n)=partial sensing initiating slot (k)+at least one of resource reservation periodicities (pre-)configured for the RP.

FIG. 5 illustrates an exemplary illustration of an early/prior indication of periodic-based partial sensing according to an embodiment of the present disclosure. In reference to diagram 100 in FIG. 5, an exemplary illustration of UE performing periodic-based partial sensing is depicted for the case when an early/prior indication of resource (re)selection trigger is provided by a higher layer (such as MAC layer), such that the UE is able to obtain pre-sensing results for preparing and reporting a subset of resources to the higher layer. FIG. 5 illustrates that, in some embodiments, for the case when the higher layer is able to determine the data message traffic to be transmitted over sidelink is generated periodically with a same predictable pattern and attributes (e.g., transmission frequency, priority, latency requirement and data packet size), the higher layer provides in slot (k) 101 to the UE an early/prior indication of a resource selection to be triggered in slot (n) 102 along with necessary attributes associated with the sidelink transmission and a selected SL resource pool to initiate the periodic-based partial sensing in advanced to the resource (re)selection trigger slot (n). In an example, once the slot timing (n) for the future resource (re)selection trigger is received in slot (k) 101, the UE first selects Y candidate slots 103 within a resource selection window 104 within a time interval of [n+$T_1$, n+$T_2$] based on the latency requirement/remaining PDB provided by the higher layer and a UE processing time. In an example, once the Y candidate slots are selected, the UE determines periodic sensing occasions in which the slots should be monitored by decoding PSCCH transmitted from others and measuring their RSRP. Assuming the set of (pre-)configured reservation periodicities allowed for periodic resource reservation for another $T_B$ in the selected resource pool is [500, 400, 200, 100] ms, then the set of periodic sensing occasions should be 500 ms, 400 ms, 200 ms, and 100 ms earlier/prior to the selected Y candidate slots.

In reference to the diagram 100 in FIG. 5, these periodic sensing occasions are 105, 106, 107, and 108 which correspond to Y-100 ms, Y-200 ms, Y-400 ms, and Y-500 ms prior to the Y candidate slots, respectively. Then the UE monitors in slots within these periodic sensing occasions to obtain pre-sensing results containing resource assignment and reservation information and RSRP measurements necessary for the preparation and reporting of a subset of resources to the higher layer when the resource selection is triggered in slot (n) 102.

Exemplary mechanism for resource allocation in method 2: Switching to a different resource allocation mode—random resource selection, and using a different resource pool, e.g., exceptional pool or a pool that supports random resource selection:

In another embodiment of the present disclosure, an exemplary method 2 for the case when higher layer(s) of a terminal could not predict a resource (re)selection trigger far in advance as in the previous exemplary method 1 to ensure periodic-based partial sensing/pre-sensing results are available at the time of the resource (re)selection trigger slot (n) and a new sidelink data message needs to be transmitted urgently, the higher layer (similar to exemplary method 1) provides an early/prior indication of a resource (re)selection trigger in slot (n) for the UE to perform periodic-based partial sensing to obtain pre-sensing results while it triggers another resource (re)selection procedure in a second sidelink RP for an urgent/immediate transmission of one or more MAC PDUs/TBs until the resource (re)selection is triggered in slot (n) in the first selected resource pool. Then the UE switches back to a first RP for continuing transmission of subsequent MAC PDUs/TBs and reserves resources periodically. A second sidelink RP does not support periodic reservation (i.e., resource reservation for another TB is disabled), but it allows random resource selection. For example, it could be an exceptional pool.

It is understood that, in an example, one possible reason for the higher layer of the terminal not able to predict a resource (re)selection trigger far in advance to obtain pre-sensing results in advance could be due to merging of two MAC PDUs/TBs and causing a resource re-selection to be triggered by sudden changes in MAC PDU/TB size, periodicities, priority, or latency requirement. That is, the higher layer initiates periodic-based partial sensing in slot (k) and provides an early/prior indication of a resource (re)selection trigger in slot (n) for a first resource pool and triggers a separate resource (re)selection procedure for a second resource pool in slot (j), where the timing of slot (j) is not necessarily the same as slot (k), but they can be (i.e., j=k). The said separate resource (re)selection procedure to be performed on the second RP for the urgent/immediate transmission can be a random resource selection or based on a contiguous partial sensing with setting $T_A$ and $T_B$ to zero or positive values. When the random resource selection is used for the immediate/urgent SL transmission, it relies on other UEs to sense and avoid transmission collision with the random selected transmissions from the UE (e.g., other UE performing re-evaluation and pre-emption checking).

In some embodiments, when the resource (re)selection procedure is triggered in slot (j) to report a subset of candidate resources based on contiguous partial sensing by decoding PSCCH and measuring RSRP, one or more of the following parameters for the PSCCH/PSSCH transmission is provided by the higher layer: L1 priority, the remaining PDB, or the number of sub-channels to be used for the PSCCH/PSSCH transmission. In some embodiments, the UE initializes a full set of resources containing all candidate resources within a resource selection window (RSW) defined as [j+$T_1$, j+$T_2$]. The UE monitors slots within a contiguous time duration [j+$T_A$, j+$T_B$] and excludes one or more resources from the full set of candidate resources when the resource has been indicated/reserved by a received SCI and the measured RSRP is higher than a corresponding RSRP threshold, wherein the value for $T_A$ and $T_B$ can be zero or positive. Optionally, when $T_A$ and $T_B$ values are both zero, no resource is excluded from the full set of candidate resource, which is then reported to the higher layer. In this case, it is equivalent to random resource selection within the RSW. The UE then reports the remaining candidate resources after exclusion (which is the subset of resources) to the higher layer in or after slot (j+$T_B$). Optionally, the value for $T_B$ could be defined as 32 slots or less, which is align with the maximum time interval that can be indicated by the time assignment field in a SCI format.

Figure 6:
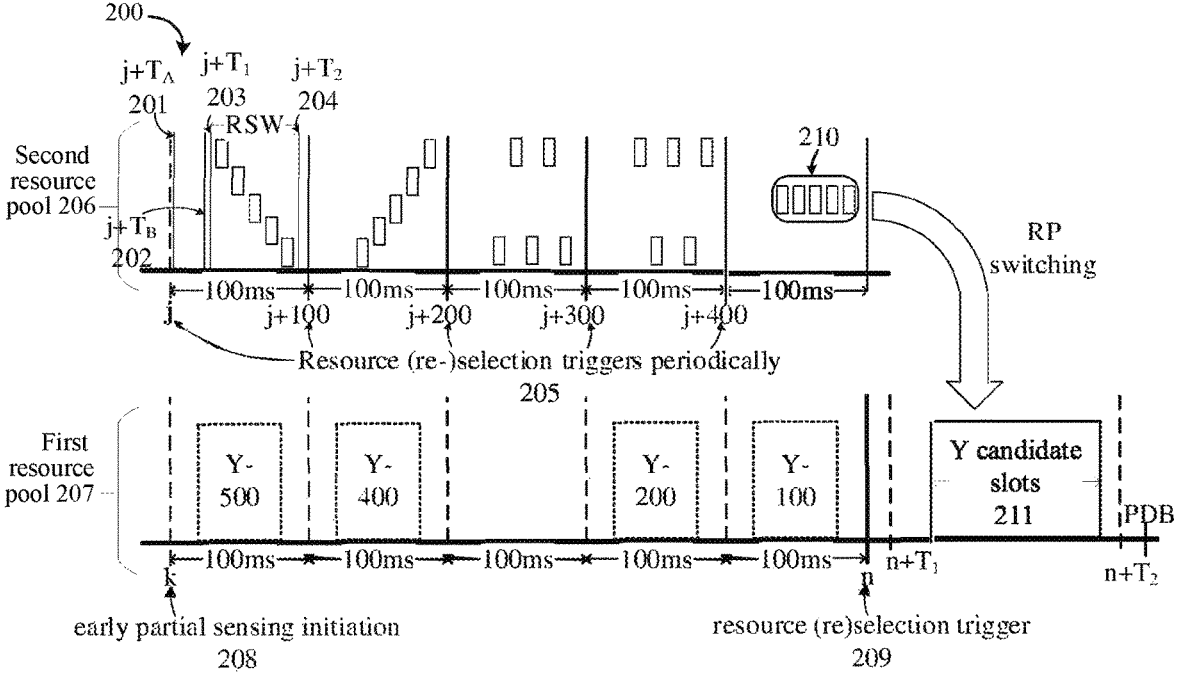
FIG. 6 is a schematic diagram illustrating an exemplary illustration of an early initiation of periodic-based partial sensing on one resource pool (RP) while performing contiguous partial sensing and sidelink (SL) transmissions on another RP according to an embodiment of the present disclosure.

FIG. 6 illustrates an exemplary illustration of an early initiation of periodic-based partial sensing on one resource pool (RP) while performing contiguous partial sensing and sidelink (SL) transmissions on another RP according to an embodiment of the present disclosure. In reference to diagram 200 in FIG. 6, an exemplary illustration of a UE is triggered by a higher layer for early initiation in slot (k) 208 to perform periodic-based partial sensing according to reservation periodicities (pre-)configured for a first sidelink RP 207 for a future resource selection to be triggered in slot (n) 109, while the UE is triggered at the same time to perform a resource (re)selection procedure periodically based on contiguous partial sensing for immediate/urgent transmissions of sidelink MAC PDUs/TBs on a second RP 206 is depicted. FIG. 6 illustrates that, in some embodiments, on a second sidelink RP 206, the UE is triggered/configured by the higher layer to perform contiguous partial sensing in slot (j) 205 to monitor slots within a sensing window between slot (j+$T_A$) 201 and slot (j+$T_B$) 202 for selecting an initial and retransmission resources of a MAC PD/TB within a resource selection window between (j+$T_1$) 203 and (j+$T_2$) 204 for the first transmission period [j, j+100 ms]. Then the same resource (re)selection is triggered in slot j+100, j+200, j+300 and j+400 to select SL (re)transmission resources for new MAC PDU/TB in every transmission period 205 until the last set of transmissions 210 before the resource (re)selection trigger slot (n) 209. Then the SL resources for transmitting the subsequent MAC PD/TB will be selected from the Y candidate slots 211 on the first RP 207.

Exemplary mechanism for resource allocation in an exemplary method 3: Switching to a different resource allocation mod—random resource selection for at least the very first/initial MAC PDU/TB, and possibly periodically reserve the randomly selected resources for subsequent MAC PDUs/TBs until the resource (re)selection trigger slot (n), then these resources are re-evaluated/pre-emption checked with full periodic-based partial sensing results to determine if any resource needs to be re-selected:

In yet another embodiment of the present disclosure, an exemplary method 3 for the case when higher layer(s) of the terminal could not predict a resource (re)selection trigger far in advance to ensure periodic-based partial sensing/pre-sensing results are available at the time of the resource (re)selection trigger slot (n) and a new sidelink data message needs to be transmitted urgently, the higher layer (similar to the exemplary method 2) provides an early/prior indication for a resource (re)selection to be triggered in slot (n) and the UE is initiated to perform periodic-based partial sensing in slot (k) to obtain pre-sensing results in corresponding periodic sensing occasion(s) while a random resource (re) selection procedure is also triggered in the same first sidelink RP for the urgent/immediate transmission of one or more MAC PDUs/TBs until the resource (re)selection is triggered in slot (n).

In some embodiments, when the random resource selection is additionally triggered (e.g., in slot k) to report a set of all candidate resources to the higher layer for a PSCCH/PSSCH transmission, the set of all candidate resources is determined according to at least one of the followings provided by the higher layer: the number of sub-channels to be used for the PSCCH/PSSCH transmission provided by the higher layer ($L_{subCH}$), or a set of slots from the current transmission period that correspond to the determined Y candidate slots based on the resource reservation interval ($P_{rsvp\_TX}$) for the PSCCH/PSSCH transmission. In some embodiments, the higher layer then randomly selects one or more resources among the reported set of all candidate resources for transmission of a sidelink MAC PDU/TB. When the UE performs the PSCCH/PSSCH transmission, the resource reservation period field in SCI is set corresponding to the resource reservation interval ($P_{rsvp\_TX}$) provided by the higher layer for reserving SL resources periodically. As oppose to the previous exemplary method 2, the random selected resources for the urgent/immediate PSCCH/PSSCH (re)transmissions of a MAC PDU/TB in the same first resource pool are also reserved in the following time periods for transmitting the subsequent MAC PDUs/TBs. By announcing periodic resource reservation early in advanced, it allows other UEs operating in the same resource pool to have the opportunity to sense and actively avoid Tx collision, since these resources are selected randomly by the UE without any sensing. As such, when all the necessary pre-sensing results from the periodic-based partial sensing are available at the time of resource (re)selection trigger slot (n), these reserved resources based on random selection are subject to re-evaluation or pre-emption checking. Optionally, if one of the reserved resources are not part of the remaining candidate resource set during the checking process for reporting, the higher layer removes the affected resource from the sidelink grant and select a replacement resource from the reported candidate resource set. Alternatively, the higher layer selects a new set of resources from the reported candidate resource set for the following PSCCH/PSSCH transmission of the next MAC PDU/TB.

Figure 7:
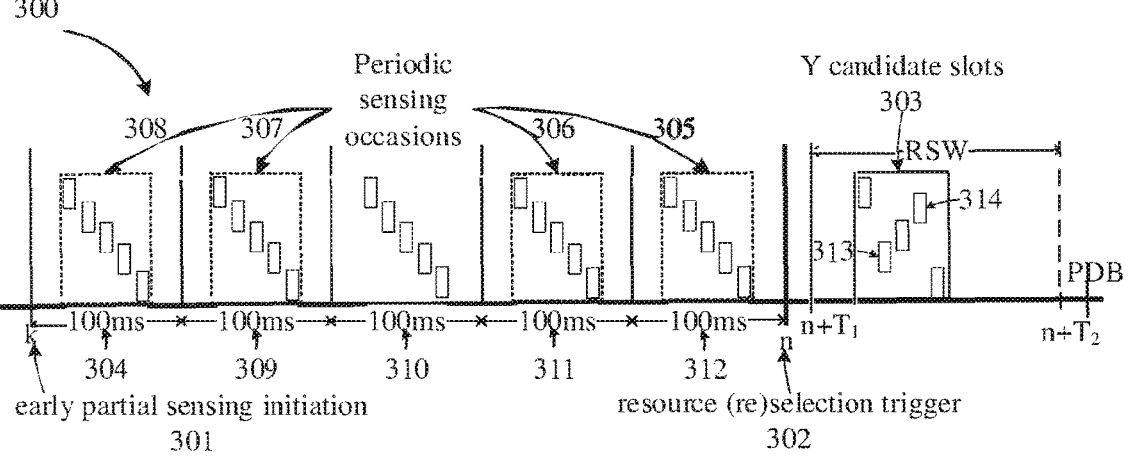
FIG. 7 is a schematic diagram illustrating an exemplary illustration of a UE performing periodic-based partial sensing based on early indication of resource (re)selection trigger while transmitting urgent sidelink medium access control (MAC) protocol data units (PDUs)/transport blocks (TBs) using randomly selected and periodically reserved resources according to an embodiment of the present disclosure.

FIG. 7 illustrates an exemplary illustration of a UE performing periodic-based partial sensing based on early indication of resource (re)selection trigger while transmitting urgent sidelink medium access control (MAC) protocol data units (PDUs)/transport blocks (TBs) using randomly selected and periodically reserved resources according to an embodiment of the present disclosure. In reference to diagram 300 in FIG. 7, an exemplary illustration of a UE, up on arrival of an urgent sidelink MAC PDU/TB in slot (k) 301 that needs to be transmitted immediately, is provided by a higher layer an early indication of a resource (re)selection to be triggered in slot (n) 302 in order to initiate the UE to perform periodic-based partial sensing. FIG. 7 illustrates that, in some embodiments, for the periodic-based partial sensing, the UE first selects a set of Y candidate slots 303 within a resource selection window (RSW) [n+$T_1$, n+$T_2$] and performs monitoring of slots in periodic sensing occasions 305, 306, 307, and 308 by decoding PSCCH and measuring RSRP to obtain pre-sensing results for the resource (re)selection trigger in slot (n) 302. At the same time, the UE is also requested by the higher layer (e.g., in slot (k) 301) to report a set of all candidate resources within the current transmission period 304 that correspond to the set of Y candidate slots 303 selected during the periodic-based partial sensing process. The higher layer random selects a set of 5 sidelink resources for the initial and re-transmissions of the urgent sidelink MAC PDU/TB in the current transmission period 304 and periodically reserves the same set of resources in the following transmission periods 309, 310, 311, and 312 for periodic transmission of the subsequent MAC PDUs/TBs before the resource (re) selection trigger in slot (n) 302. Then based on the pre-sensing results obtained from the periodic-based partial sensing, it is re-evaluated whether the set of random selected and reserved resources are still in the subset of candidate resources after excluding all resources reserved by others. Since it is found that two of the five reserved resources are no longer part of the remaining candidate set reported to the higher layer, they are replaced by selecting resources 313 and 314 from the reported candidate set.

In summary, in some embodiments, the exemplary method 1 provides at least one of the followings. The UE is initiated by a higher layer in slot (k) to start periodic-based partial sensing to monitor slots belonging to at least one periodic sensing occasion that corresponds to a set of selected Y candidate slots on a first sidelink resource pool for a PSCCH/PSSCH transmission, according to one or more of the following parameters: a first/the indicated sidelink resource pool from which a subset of resources is to be reported, L1 priority—(e.g., for determining the size of Y candidate slots and/or resource exclusion), remaining packet delay budget (PDB)—to determine a resource selection window, a number of sub-channels to be used for the PSCCH/PSSCH transmission, or a resource reservation interval ($P_{rsvp\_TX}$) for the PSCCH/PSSCH transmission and/ or determining a resource (re)selection trigger slot (n). Optionally, the set of Y candidate slots are selected by the UE within a resource selection window based on a resource (re)selection trigger slot (n). Optionally, the resource (re) selection trigger slot (n) can be determined based on: an early/prior indication from the higher layer (e.g., in slot (k) along with the periodic-based partial sensing initiation), determined according to slot (n)=slot (k)+at least one resource reservation interval ($P_{rsvp\_TX}$) indicated by the higher layer, determined according to slot (n)=slot (k)+at least one maximum resource reservation period (pre-)con-figured for the RP, or determined according to slot (n)=slot (k)+at least one of resource reservation periodicities (pre-) configured for the RP. Optionally, a UE is configured to perform partial sensing by the higher layer. Optionally, the higher layer is the MAC layer of the communication termi-nal. Optionally, the UE initializes a full set of resources containing all candidate resources within the Y candidate slots. Optionally, the UE excludes one or more resources from the full set of candidate resources when the resource has been indicated/reserved by a received SCI during at least the periodic-based partial sensing and the measured RSRP is higher than a corresponding RSRP threshold. Optionally, the UE reports the subset of resources (which is the remaining candidate resources after exclusion) to the higher layer at the resource (re)selection trigger slot (n) or after but before the first slot of the Y candidate slots.

In summary, in some embodiments, the exemplary method 2 provides at least one of the followings. In some embodiments, the UE is additionally indicated by the higher layer a second sidelink resource pool for PSCCH/PSSCH transmission of at least one sidelink MAC PDU/TB before the resource (re)selection trigger slot (n) for the first resource pool. Optionally, the second RP is a sidelink exceptional pool, a pool that allows partial sensing and/or random resource selection, and/or a pool that does not support resource reservation for another TB (i.e., periodic reservation). Optionally, the indication of the second resource pool is provided from the higher layer in slot (j), which can the same or different slot to the periodic-based partial sensing initiation slot (k) for the first resource pool. Optionally, in slot (j), the UE is triggered to perform a resource (re)selection procedure to report a subset of can-didate resources based on partial sensing by decoding PSCCH and measuring RSRP, and in accordance with one or more of the following parameters for the PSCCH/PSSCH transmission of at least one sidelink MAC PDU/TB: L1 priority, the remaining packet delay budget (PDB), or the number of sub-channels to be used for the PSCCH/PSSCH transmission. Optionally, the UE initializes a full set of resources containing all candidate resources within a resource selection window (RSW) defined as [j+$T_1$, j+T 2]. Optionally, the UE monitors slots within a contiguous time duration [j+$T_A$, j+$T_B$] and excludes one or more resources from the full set of candidate resources when the resource has been indicated/reserved by a received SCI and the measured RSRP is higher than a corresponding RSRP threshold, wherein the value for $T_A$ and $T_B$ can be at least zero or positive. Optionally, the UE reports the subset of resources (which is the remaining candidate resources after exclusion) to the higher layer in or after slot (j+$T_B$).

In summary, in some embodiments, the exemplary method 3 provides at least one of the followings. In some embodiments, when the first sidelink resource pool supports random resource selection, the UE is requested to report a set of all candidate resources to the higher layer in slot (k) for a PSCCH/PSSCH transmission. Optionally, the set of all candidate resources is determined according to at least one of the followings: the number of sub-channels to be used for the PSCCH/PSSCH transmission provided by the higher layer, or a set of slots from the current transmission period that correspond to the determined Y candidate slots based on the resource reservation interval ($P_{rsvp\_TX}$) for the PSCCH/ PSSCH transmission. Optionally, the higher layer randomly selects one or more resources among the reported set of all candidate resources for transmission of a sidelink MAC PDU/TB. Optionally, when the UE transmits PSCCH/ PSSCH, the resource reservation period field in SCI format is set according to the resource reservation interval ($P_{rsvp\_TX}$) provided by the higher layer. Optionally, if one of the reserved resources is not part of the reported subset of candidate resources to the higher layer, the reserved resource is removed from the sidelink grant and replaced with a re-selected resource from the reported subset of resources.

Commercial interests for some embodiments are as fol-lows. 1. Solving issues in the prior art. 2. Reducing power consumption wastage. 3. Handling other sudden and unpre-dictable resource selection/re-selection triggers. 4. Reducing transmission collisions with aperiodic traffic from other UEs. 5. Providing good communication performance 6. Providing high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smart-phone makers, smart watches, wireless earbuds, wireless headphones, communication devices, remote control vehicles, and robots for public safety use, AR/VR device maker for example gaming, conference/seminar, education purposes, smart home appliances including TV, stereo, speakers, lights, door bells, locks, cameras, conferencing headsets, and etc., smart factory and warehouse equipment including IIoT devices, robots, robotic arms, and simply just between production machines. In some embodiments, commercial interest for the disclosed disclosure and business importance includes lowering power consumption for wireless communication means longer operating time for the device and/or better user experience and product satisfaction from longer operating time between battery charging. Some embodiments of the present disclosure are a combination of "techniques/processes" that can be adopted in 3GPP specification to create an end product. Some embodiments of the present disclosure relate to mobile cellular communication technology in 3GPP NR Release 17 and beyond for providing multicast and broadcast services.

Figure 8:
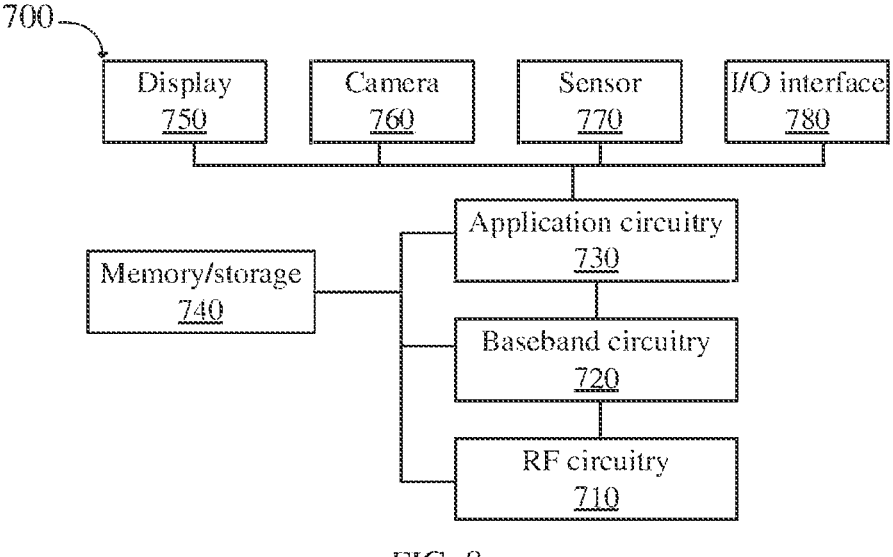
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A resource selection method in sidelink communication by a user equipment (UE), comprising:
being triggered in a first slot, by a periodic-based partial sensing initiation from a higher layer, to start a periodic-based partial sensing; and performing the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain;
wherein the UE initializes a set of resources containing candidate resources within the set of candidate slots;
wherein the UE is configured to receive a first sidelink control information (SCI) from another UE in the second slots belonging to the at least one periodic sensing occasion, the UE is configured to measure a first reference signal received power (RSRP) for the received first SCI during the periodic-based partial sensing, and when one or more resources from the candidate resources have been indicated/reserved by the first SCI and the associated first RSRP is higher than a first RSRP threshold, the UE excludes the one or more resources from the candidate resources;
wherein the UE reports a subset of resources from the first sidelink resource pool to the higher layer in a resource (re)selection trigger slot or after the resource (re) selection trigger slot but before a starting slot of the set of candidate slots, and the subset of resources comprises remaining candidate resources after exclusion.

2. The method of claim 1, wherein the sidelink transmission comprises at least one of a physical sidelink control channel (PSCCH) transmission or a physical sidelink shared channel (PSSCH) transmission.

3. The method of claim 1, wherein the UE performs the periodic-based partial sensing according to one or more of the followings:
the first sidelink resource pool from which a subset of resources is to be reported;
a layer 1 (L1) priority for the sidelink transmission;
a remaining packet delay budget (PDB) configured to determine a first resource selection window;
a number of sub-channels to be used for the sidelink transmission; or
at least one of the following: at least one resource reservation interval ($P_{rsvp\_TX}$) for the sidelink transmission or at least one resource reservation interval ($P_{rsvp\_TX}$) configured to determine the resource (re)selection trigger slot for the set of candidate slots.

4. The method of claim 3, wherein the set of candidate slots are selected by the UE within the first resource selection window based on the resource (re)selection trigger slot.

5. The method of claim 3, wherein the resource (re) selection trigger slot can be determined based on:
a location of the resource (re)selection trigger slot in the time domain equal to a location of the first slot in the time domain plus the at least one resource reservation interval ($P_{rsvp\_TX}$) in the time domain indicated by the higher layer.

6. The method of claim 1, wherein the higher layer comprises a medium access control (MAC) layer on a UE side.

7. A user equipment (UE), comprising:
a memory;
a transceiver; and
a processor coupled to the memory and the transceiver;

wherein the processor is configured to be triggered in a first slot, by a periodic-based partial sensing initiation from a higher layer, to start a periodic-based partial sensing; and wherein the processor is configured to perform the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain;

wherein the processor initializes a set of resources containing candidate resources within the set of candidate slots;

wherein the transceiver is configured to receive a first sidelink control information (SCI) from another UE in the second slots belonging to the at least one periodic sensing occasion, the processor is configured to measure a first reference signal received power (RSRP) for the received first SCI during the periodic-based partial sensing, and when one or more resources from the candidate resources have been indicated/reserved by the first SCI and the associated first RSRP is higher than a first RSRP threshold, the processor excludes the one or more resources from the candidate resources;

wherein the processor reports a subset of resources from the first sidelink resource pool to the higher layer in a resource (re)selection trigger slot or after the resource (re)selection trigger slot but before a starting slot of the set of candidate slots, and the subset of resources comprises remaining candidate resources after exclusion.

8. The UE of claim 7, wherein the sidelink transmission comprises at least one of a physical sidelink control channel (PSCCH) transmission or a physical sidelink shared channel (PSSCH) transmission.

9. The UE of claim 7, wherein the processor performs the periodic-based partial sensing according to one or more of the followings:

the first sidelink resource pool from which a subset of resources is to be reported;

a layer 1 (L1) priority for the sidelink transmission;

a remaining packet delay budget (PDB) configured to determine a first resource selection window;

a number of sub-channels to be used for the sidelink transmission; or at least one of the following: at least one resource reservation interval ($P_{rsvp\_TX}$) for the sidelink transmission or at least one resource reservation interval ($P_{rsvp\_TX}$) configured to determine the resource (re)selection trigger slot for the set of candidate slots.

10. The UE of claim 9, wherein the set of candidate slots are selected by the processor within the first resource selection window based on the resource (re)selection trigger slot.

11. The UE of claim 9, wherein the resource (re)selection trigger slot can be determined based on:

a location of the resource (re)selection trigger slot in the time domain equal to a location of the first slot in the time domain plus the at least one resource reservation interval ($P_{rsvp\_TX}$) in the time domain indicated by the higher layer.

12. The UE of claim 7, wherein the higher layer comprises a medium access control (MAC) layer on a UE side.

13. A non-transitory machine-readable storage medium having stored thereon instructions that, when executed by a User Equipment (UE), cause the UE to perform a resource selection method comprising:

being triggered in a first slot, by a periodic-based partial sensing initiation from a higher layer, to start a periodic-based partial sensing; and performing the periodic-based partial sensing by monitoring second slots belonging to at least one periodic sensing occasion, wherein the at least one periodic sensing occasion corresponds by a resource reservation periodicity to a set of candidate slots on a first sidelink resource pool for a sidelink transmission, the first slot is earlier than the second slots in time domain, and the second slots are earlier than the set of candidate slots in the time domain;

wherein the UE initializes a set of resources containing candidate resources within the set of candidate slots;

wherein the UE is configured to receive a first sidelink control information (SCI) from another UE in the second slots belonging to the at least one periodic sensing occasion, the UE is configured to measure a first reference signal received power (RSRP) for the received first SCI during the periodic-based partial sensing, and when one or more resources from the candidate resources have been indicated/reserved by the first SCI and the associated first RSRP is higher than a first RSRP threshold, the UE excludes the one or more resources from the candidate resources;

wherein the UE reports a subset of resources from the first sidelink resource pool to the higher layer in a resource (re)selection trigger slot or after the resource (re) selection trigger slot but before a starting slot of the set of candidate slots, and the subset of resources comprises remaining candidate resources after exclusion.

14. The non-transitory machine-readable storage medium according to claim 13, wherein the sidelink transmission comprises at least one of a physical sidelink control channel (PSCCH) transmission or a physical sidelink shared channel (PSSCH) transmission.

* * * * *